United States Patent [19]

Schundehutte

[11] 4,122,079
[45] Oct. 24, 1978

[54] REACTIVE AZO DYESTUFFS FROM DIAZOTIZED SULFO-AMINO NAPHTHALENES AND DIAMINOSULFOBENZENES

[75] Inventor: Karl-Heinz Schündehütte, Opladen, Germany

[73] Assignee: Bayer Aktiengesellschaft, Leverkusen, Germany

[21] Appl. No.: 346,899

[22] Filed: Apr. 2, 1973

Related U.S. Application Data

[63] Continuation of Ser. No. 61,804, Aug. 6, 1970, abandoned, which is a continuation of Ser. No. 686,816, Nov. 30, 1967, abandoned.

[30] Foreign Application Priority Data

Dec. 9, 1966 [DE] Fed. Rep. of Germany ... 6650891[U]

[51] Int. Cl.² ............ C09B 62/02; C09B 62/08; C09B 62/24; C09B 62/70
[52] U.S. Cl. .................... 260/153; 260/154; 260/155; 260/156; 260/157; 260/158; 260/196
[58] Field of Search ............ 260/153, 154, 146 D, 260/146 T, 158, 146 R, 152, 155, 156, 157, 196

[56] References Cited

U.S. PATENT DOCUMENTS

| 2,892,830 | 6/1959 | Stephen | 260/153 |
|---|---|---|---|
| 2,895,785 | 7/1959 | Alsberg et al. | 260/153 X |
| 2,945,022 | 7/1960 | Fasciati et al. | 260/153 |
| 2,951,836 | 9/1960 | Stephen | 260/153 |
| 3,127,389 | 3/1964 | Seitz et al. | 260/146 D |
| 3,151,105 | 9/1964 | Andrew et al. | 260/153 |
| 3,170,911 | 2/1965 | Benz et al. | 260/153 |
| 3,320,231 | 5/1967 | Ammann et al. | 260/153 |
| 3,438,962 | 4/1969 | Riat et al. | 260/153 |

Primary Examiner—Charles F. Warren
Attorney, Agent, or Firm—Plumley and Tyner

[57] ABSTRACT

Reactive dyestuffs of the formula:

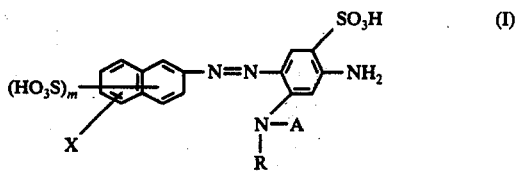

wherein
R is H, alkyl or aryl,
A is a reactive group
$m$ is 2 or 3
X is hydrogen, halogen, nitro or triazolyl which are useful for dyeing or printing of cellulose and NH containing materials.

23 Claims, No Drawings

REACTIVE AZO DYESTUFFS FROM DIAZOTIZED SULFO-AMINO NAPHTHALENES AND DIAMINOSULFOBENZENES

This is a Continuation of application, Ser. No. 61,804 now abandoned filed Aug. 6, 1970 which is a continuation of Ser. No. 686,816 now abandoned, filed Nov. 30, 1967.

The present invention relates to valuable new reactive dyestuffs of the general formula

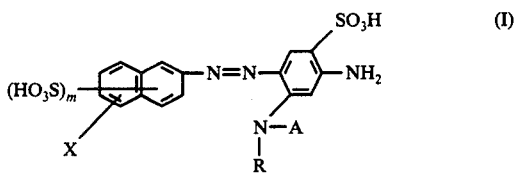

Therein R stands for hydrogen, an alkyl or aryl radical, A is a reactive group, m stands for the number 2 or 3, and X is hydrogen, a halogen, nitro or triazolo substituent.

The term reactive groups A is known to mean those groupings which contain one or more reactive groups or eliminatable substituents which are capable of reacting with the hydroxyl groups of cellulose with the formation of covalent bonds, when the dyestuffs are applied to cellulose materials in the presence of acid-binding agents and optionally with the action of temperature. A large number of such reactive groups are known from the literature. The groupings given below are therefore only a selection of possible reactive groups X in the new dyestuffs. Suitable reactive groups are, inter alia, those which contain at least one reactive substituent attached to a 5- or 6-membered heterocyclic ring, such as a monazine, diazine, triazine, e.g. pyridine, pyrimidine, pyridazine, pyrazine, thiazine, oxazine or asym.- or sym-triazine ring, or to such a ring system which contains one or more fused aromatic rings, such as a quinoline, phthalazine, cinnoline, quinazoline, quinoxaline, acridine, phenazine and phenanthridine ring system; consequently, the 5- or 6-membered heterocyclic rings containing at least one reactive substituent are preferably those which contain one or more nitrogen atoms and may contain fused 5-membered or, preferably, 6-membered carbocyclic rings. Examples of reactive substituents on the heterocycle are, for example, halogen (Cl, Br or F), ammonium, including hydrazinium, sulphonium, sulphonyl, azido-(N₃), thiocyano, thio, thioether, hydroxyether, sulphinic acid and sulphonic acid. Individual examples are mono- or dihalo-sym.-triazinyl radicals, e.g. 2,4-dichlorotriazinyl-6, 2-amino-4-chlorotriazinyl-6-; 2-alkylamino-4-chlorotriazinyl-6-, such as 2-methylamino-4-chlorotriazinyl-6-, 2-ethylamino- or 2-propylamino-4-chlorotriazinyl-6-, 2-β-hydroxyethylamino-4-chlorotriazinyl-6-, 2-di-β-hydroxyethylamino-4-chlorotriazinyl-6- and the corresponding sulphuric acid semiesters, 2-diethylamino-4-chlorotrianzinly-6-, 2-morpholino- or 2-piperidino-4-chlorotriazinyl-6-, 2-cyclohexylamino-4-chlorotriazinyl-6-; 2-arylamino- and subst. arylamino-4-chlorotriazinyl-6-, such as 2-phenylamino-4-chlorotriazinyl-6-, 2-(o-, m- or p-sulphophenyl)-amino-4-chlorotriazinyl-6-; 2-alkoxy-4-chlorotriazinyl-6-, such as 2-methoxy- or -ethoxy-4-chlorotriazinyl-6-, 2-(phenylsulphonylmethoxy)-4-chlorotriazinyl-6-; 2-aryloxy and subst. aryloxy-4-chlorotriazinyl-6-, such as 2-phenoxy-4-chlorotriazinyl-6-, 2-(p-sulphophenyl)-oxy-4-chlorotriazinyl-6-, 2-(o-, m- or p-methyl- or methoxyphenyl)-oxy-4-chlorotriazinyl-6-; 2-alkylmercapto- or 2-arylmercapto- or 2-(subst. aryl)-mercapto-4-chlorotriazinyl-6-, such as 2(β-hydroxyethyl)-mercapto-4-chlorotriazinyl-6-, 2-phenylmercapto-4-chlorotriazinyl-6-, 2-(4'-methylphenyl)-mercapto-4-chlorotriazinyl-6-, 2-(2',4'-dinitro)-phenylmercapto-4-chlorotriazinyl-6-; mono-, di- or trihalo-pyrimidyl radicals, such as 2,4-dichloropyrimidyl-6-, 2,4,5-trichloropyrimidyl-6-, 2,4-dichloro-5-nitro- or -5-methyl- or -5-carboxymethyl- or -5-carboxy- or -5-cyano- or -5-vinyl- or -5-sulpho- or -5-mono-, -di- or -trichloromethyl- or -5-carboalkoxy-pyrimidyl-6-, 2,6-dichloropyrimidine-4-carbonyl-, 2,4-dichloropyrimidine-5-carbonyl-, 2-chloro-4-methyl-pyrimidine-5-carbonyl-, 2-methyl-4-chloropyrimidine-5-carbonyl-, 2-methylthio-4-fluoropyrimidine-5-carbonyl-, 6-methyl-2,4-dichloropyrimidine-5-carbonyl-, 2,4,6-trichloropyrimidine-5-carbonyl-, 2,4-dichloropyrimidine- 5-sulphonyl- or -5-carbonyl-, 2-chloroquinoxaline-3-carbonyl-, 2- or 3-mono-chloroquinoxaline-6-carbonyl-, 2- or 3-mono-chloroquinoxaline-6-sulphonyl-, 2,3-dichloroquinoxaline-6-carbonyl-, 2,3-dichloroquinoxaline-6-sulphonyl-, 1,4-dichlorophthalazine-6-sulphonyl- or -6-carbonyl-, 2,4-dichloroquinoxaline-7- or -6-sulphonyl- or -carbonyl-, 2- or 3- or 4-(4',5'-dichloropyridazone-6'-yl-1')-phenylsulphonyl- or -carbonyl-, β-(4',5'-dichloropyridazone-6'-yl-1')-ethylcarbonyl-, N-methyl-N-(2,4-dichlorotriazinyl-6-)-carbamyl-, N-methyl-N-(2-methylamino-4-chlorotriazinyl-6)-carbamyl-, N-methyl-N-(2-dimethylamino-4-chlorotriazinyl-6)-carbamyl-, N-methyl- or N-ethyl-N-(2,4-dichlorotriazinyl-6)-aminoacetyl-, N-methyl-N-(2,3-dichloroquinoxaline-6-sulphonyl)-aminoacetyl-, N-methyl-N-(2,3-dichloroquinoxaline-6-carbonyl)-aminoacetyl-, and the corresponding bromine and fluorine derivatives of the above chloro-substituted heterocyclic radicals; sulphonyl group-containing triazine radicals, such as 2,4-bis-(phenylsulphonyl)-triazinyl-6-, 2-(3'-carboxyphenyl)-sulphenyl-4-chlorotriazinyl-6-, 2-(3'-sulphophenyl)-sulphonyl-4-chlorotriazinyl-6-, 2,4-bis-(3'-carboxyphenyl-sulphonyl-1')-triazinyl-6-; sulphonyl group-containing pyrimidine rings, such as 2-carboxymethylsulphonyl-pyrimidinyl-4, 2-methylsulphonyl-6-methyl-pyrimidinyl-4,2-methylsulphonyl-6-ethyl-pyrimidinyl-4, 2-phenylsulphonyl-5-chloro-6-methylpyrimidinyl-4, 2,6-bis-methylsulphonylpyrimidinyl-4, 2,6-bis-methylsulphonyl-5-chloro-pyrimidinyl-4, 2,4-bis-methylsulphonyl-pyrimidine-5-sulphonyl, 2-methylsulphonyl-pyrimidinyl-4, 2-phenylsulphonyl-pyrimidinyl-4, 2-trichloromethylsulphonyl-6-methyl-pyrimidinyl-4, 2-methylsulphonyl-5-chloro-6methyl-pyrimidinyl-4, 2-methylsulphonyl-5-bromo-6-methyl-pyrimidinyl-4, 2-methylsulphonyl-5-chloro-6-ethylpyrimidinyl-4, 2-methylsulphonyl-5-chloro-6-chloromethylpyrimidinyl-4, 2-methylsulphonyl-4-chloro-6-methylpyrimidine-5-sulphonyl, 2-methylsulphonyl-5-nitro-6-methyl-pyrimidinyl-4, 2,5,6-tris-methylsulphonyl-pyrimidinyl-4, 2-methylsulphonyl-5,6-dimethyl-pyrimidinyl-4, 2-ethylsulphonyl-5-chloro-6-methylpyrimidinyl-4, 2-methylsulphonyl-6-chloro-pyrimidinyl-4, 2,6-bis-methylsulphonyl-5-chloro-pyrimidinyl-4, 2-methylsulphonyl-6-carboxy-pyrimidinyl-4, 2-methylsulphonyl-5-sulpho-pyrimidinyl-4, 2-methylsulphonyl-6-carbomethoxy-pyrimidinyl-4, 2-methylsulphonyl-5-carboxy-pyrimidinyl-4, 2-methylsulphonyl-5-cyano-6-methoxy-pyrimidinyl-4, 2-methylsulphonyl-5-cyloropyrimidinyl- 4, 2-sulphoethylsulphonyl-6-methyl-pyrimidinyl-4, 2-methylsulphonyl-5-bromo-pyrimidinyl-4, 2-phenylsulphonyl-5-chloro-pyrimidinyl-4, 2-carboxymethylsulphonyl-5-chloro-6-methyl-pyrimidinyl-4, 2-methylsulphonyl-6-chloropyrimidine-4- and -5-carbonyl-, 2,6-bis-(methylsulphonyl)-pyrimidine-4- or -5-carbonyl-, 2-ethylsulphonyl-6-chloropyrimidine-5-carbonyl-, 2,4-bis-(methylsulphonyl)-pyrimidine-5-sulphonyl-, 2-methylsulphonyl-4-chloro-6-methylpyrimidine-5-sulphonyl- or -carbonyl-; ammonium group-containing triazine rings, such as 2-trimethylammonium-4-phenylamino- or -4-(o-, m- or p-sulphophenyl)-aminotriazinyl-6-, 2-(N,N-dimethylhydrazinium)-4-phenylamino- or -4-(o-, m- or p-sulphophenyl)-aminotriazinyl-6-, 2-(N'-isopropylidene-N,N-dimethyl)-hydrazinium-4-phenylamino- or -4-(o-, m- or p-sulphophenyl)-aminotriazinyl-6-, 2-N-aminopyrrolidinium- or 2-N-aminopiperidinium-4-phenylamino- or -4-(o-, m- or p-sulphophenyl)-aminotriazinyl-6-; further 4-phenylamino- or 4-(sulphophenylamino)-triazinyl-6 radicals containing 1,4-bis-aza-bicyclo-[2,2,2]-octane or 1,2-bis-aza-bicyclo-0,3,3]-octane attached in quaternary linkage in the 2-position via a nitrogen bond; 2-pyridinium-4-phenylamino- or -4-(o-, m- or p-sulphophenyl)-amino-triazinyl-6- and the corresponding 2-oniumtriazinyl-6 radicals substituted in the 4-position by alkylamino, such as methylamino, ethylamino or β-hydroxyethylamino groups; alkoxy, such as methoxy or ethoxy or aroxy, such as phenoxy- or sulphophenoxy groups; 2-chlorobenzothiazole-5- or -6-carbonyl- or -5- or -6-sulphonyl-, 2-arylsulphonyl- or -alkylsulphonylbenzothiazole-5- or -6-carbonyl- or -5- or -6-sulphonyl-, such as 2-methylsulphonyl- or 2-ethylsulphonyl-benzothiazole-5- or -6-sulphonyl- or -carbonyl-, 2-phenylsulphonyl-benzothiazole-5- or -6-sulphonyl- or -carbonyl-; and the corresponding 2-sulphonylbenzothiazole-5- or -6-carbonyl- or -sulphonyl derivatives containing sulpho groups in the fused benzene ring; 2-chlorobenzoxazole-5- or -6-carbonyl- or -sulphonyl-, 2-chlorobenzimidazole-5- or -6-carbonyl- or -sulphonyl-, 2-chloro-1-methylbenzimidazole-5- or -6-carbonyl- or -sulphonyl-, 2-chloro-4-methylthiazole-(1,3)-5-carbonyl- or -4- or -5-sulphonyl-, N-oxide of 4-chloro- or 4-nitroquinoline-5-carbonyl.

Reactive groups of the aliphatic series should also be mentioned, such as acryloyl, mono-, di- or trichloroacyloyl, such as —CO—CH=CH—Cl, —CO—CCl=CH$_2$, —CO—CCl=CH—CH$_3$, further —CO—CCl=CH—COOH, —CO—CH=CCl—COOH, β-chloropropionyl, 3-phenylsulphonylpropionyl, 3-methylsulphonylpropionyl, 3-ethylsulphonylpropionyl, β-sulphatoethyl, β-sulphatoethylaminosulphonyl, vinylsulphonyl, β-chloroethylsulphonyl, β-sulphatoethylsulphonyl, β-methylsulphonylethylsulphonyl, β-phenylsulphonylethylsulphonyl, 3-sulphatopropionyl, 2,2,3,3-tetrafluorocyclobutanecarbonyl-1 or -sulphonyl-1 and β-(2,2,3,3-tetrafluorocyclobutyl-1)-acryloyl groups.

In the general formula (I) R preferably stands for hydrogen or an alkyl radical containing 1 to 3 carbon atoms.

The new dyestuffs are obtained by coupling a diazotised 2-aminonaphthalene-di- or -trisulphonic acid which may be substituted in the manner stated above, with a compound of the formula

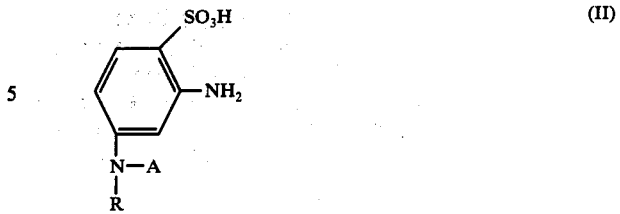

in which A and R have the same meaning as above.

Coupling takes place in an acidic, aqueous or aqueous-organic medium and attacks in the p-position to the NH$_2$ group of the coupling component. Aminonaphthalene-di- or -trisulphonic acids suitable for the reaction are, for example, 2-aminonaphthalene-4,8-disulphonic acid, 2-aminonaphthalene-5,7-disulphonic acid, 2-aminonaphthalene-6,8-disulphonic acid, 2-aminonaphthalene-3,6,8-trisulphonic acid, 2-aminonaphthalene-4,6,8-trisulphonic acid, 2-amino-6-nitronaphthalene-4,8-disulphonic acid, 2-aminonaphthalene-4,7-disulphonic acid, 2-aminonaphthalene-3,6-disulphonic acid, 2-aminonaphthalene-3,7-disulphonic acid, 2-(6-aminonaphthyl(2)-4,8-disulphonic acid)-naphtho-[1,2]-triazole-6-sulphonic acid or 2-(4-sulphophenyl)-7-aminonaphtho-[1,2]-triazole-5,9-disulphonic acid.

Coupling components of the formula (II) are obtained by condensation of 1,3-aminobenzene-4-sulphonic acid which may be substituted on the amino group in the 1-position by alkyl or aryl radicals, with compounds of the formula

A—W in which A has the same meaning as above and W represents an eliminatable substituent.

In the reaction which is generally an acylation reaction, only the amino group in the p-position to the sulphonic acid group is converted into the grouping —N(R)—A.

Suitable reactive components A—W are, for example, those on which the above reactive groups A are based, i.e. in general the halides or sulphonyl compounds of the aforesaid acyl components A. Of the large number of available compounds, the following may be mentioned by way of example:

Trihalo-sym.-triazines, such as cyanuric chloride and cyanuric bromide; dihalo-monoamino- and -mono-subst.-amino-sym.-triazines, such as 2,6-dichloro-4-aminotriazine, 2,6-dichloro-4-methylaminotriazine, 2,6-dichloro-4-ethylaminotriazine, 2,6-dichloro-4-hydroxyethylaminotriazine, 2,6-dichloro-4-phenylaminotriazine, 2,6-dichloro-4-(o-, m- or p-sulphophenyl)-aminotriazine, 2,6-dichloro-4-(2',3'-, -2',4'-, -3',4'- or -3',5'-disulphophenyl)-aminotriazine; dihaloalkoxy- and -aryloxy-sym.-triazines, such as 2,6-dichloro-4-methoxytriazine, 2,6-dichloro-4-ethoxytriazine, 2,6-dichloro-4-phenoxytriazine, 2,6-dichloro-4-(o-, m- or p-sulphophenyl)-hydroxytriazine; dihalo-alkylmercapto- and -arylmercapto-sym.-triazines, such as 2,6-dichloro-4-ethylmercaptotriazine, 2,6-dichloro-4-phenylmercaptotriazine, 2,6-dichloro-4-(p-methylphenyl)-mercaptotriazine; tetrahalo-pyrimidines, such as tetrachloro-, tetrabromo- or tetrafluoro-pyrimidine; 2,4,6-trihalo-pyrimidines, such as 2,4,6-trichloro-, tribromo- or -trifluoropyrimidine; dihalo-pyrimidines, such as 2,4-dichloro-, -dibromo- or -difluoro-pyrimidine, 2,4,6-trichloro-5-nitro- or -5-methyl- or -5-carbomethoxy- or -5-carboethoxy- or -5-carboxymethyl- or -5-moho-, -di- or -trichloromethyl- or -5-carboxy- or -5sulpho- or 5-cyano- or -5-vinyl-pyrimidine, 2,4,6-trifluoro-5-chloropyrimidine, 2,4-dichloropyrimidine-5-carboxylic acid chloride, 2,4,6-trichloropyrimidine-5-carboxylic acid chloride, 2-methyl-4-chloropyrimidine-5-carboxylic acid chloride, 2-chloro-4-methylpyrimidine-5-carboxylic acid chloride, 2,6-dichloropyrimidine-4-carboxylic acid chloride; pyrimidine reactive components with eliminatable sulphonyl groups, such as 2-carboxymethylsulphonyl-4-chloropyrimidine, 2-methylsulphonyl-4-chloro-6-methylpyrimidine, 2,4-bis-methylsulphonyl-6-methylphyrimidine, 2,4-bis-phenylsulphonyl-5-chloro-6-methylpyrimidine, 2,4,6-tris-methylsulphonylpyrimidine, 2,6-bis-methylsulphonyl-4,5-dichloropyrimidine, 2,4-bis-methylsulphonylpyrimidine-5-sulphonic acid chloride, 2-methylsulphonyl-4-chloropyrimidine, 2-phenylsulphonyl-4-chloropyrimidine, 2,4-bis-trichloromethylsulphonyl-6-methylpyrimidine, 2,4-bis-methylsulphonyl-5-chloro-6-methylpyrimidine, 2,4-bis-methylsulphonyl-5-bromo-6-methylpyrimidine, 2-methylsulphonyl-4,5-dichloro-6-methylpyrimidine, 2-methylsulphonyl-4,5-dichloro-6-chloromethylpyrimidine, 2-methylsulphonyl-4-chloro-6-methylpyrimidine-5-sulphonic acid chloride, 2-methylsulphonyl-4-chloro-5-nitro-6-methylpyrimidine, 2,4,5,6-tetramethylsulphonyl-pyrimidine, 2-methylsulphonyl-4-chloro-5,6-dimethylpyrimidine, 2-ethylsulphonyl-4,5-dichloro-6-methylpyrimidine, 2-methylsulphonyl-4,6-dichloropyrimidine, 2,4,6-tris-methylsulphonyl-5-chloropyrimidine, 2-methylsulphonyl-4-chloro-6-carboxypyrimidine, 2-methylsulphonyl-4-chloropyrimidine-5-sulphonic acid, 2-methylsulphonyl-4-chloro-6-carbomethoxypyrimidine, 2-methylsulphonyl-4-chloropyrimidine-5-carboxylic acid, 2-methylsulphonyl-4-chloro-5-cyano-6-methoxypyrimidine, 2-methylsulphonyl-4,5-dichloropyrimidine, 4,6-bismethylsulphonylpyrimidine, 4-methylsulphonyl-6-chloropyrimidine, 2-sulphoethylsulphonyl-4-chloro-6-methylpyrimidine, 2-methylsulphonyl-4-chloro-5-bromopyrimidine, 2-methylsulphonyl-4-chloro-5-bromo-6-methylpyrimidine, 2,4-bis-methylsulphonyl-5-chloropyrimidine, 2-phenylsulphonyl-4,5-dichloropyrimidine, 2-phenylsulphonyl-4,5-dichloro-6methylpyrimidine, 2-carboxymethylsulphonyl-4,5-dichloro-6-methylpyrimidine, 2-methylsulphonyl-6-chloropyrimidine-4- or -5-carboxylic acid chloride, 2-ethylsulphonyl-6-chloropyrimidine-4- or -5-carboxylic acid chloride, 2,6-bis-(methylsulphonyl)-pyrimidine-4-carboxylic acid chloride, 2-methylsulphonyl-6-methyl-4-chloro- or -4-bromopyrimidine-5-carboxylic acid chloride or -bromide, 2,6-bis-(methylsulphonyl)-4-chloropyrimidine-5-carboxylic acid chloride; further reactive components of the heterocyclic series with reactive sulphonyl substituents are, for example, 3,6-bis-phenylsulphonyl-pyridazine, 3-methylsulphonyl-6-chloropyridazine, 3,6-bis-trichloromethylsulphonylpyridazine, 3,6-bis-methylsulphonyl-4methylpyridazine, 2,5,6-tris-methylsulphonylpyrazine, 2,4-bis-methylsulphonyl-1,3,5-triazine, 2,4-bis-methylsulphonyl-6-(3'-sulphophenylamino)-1,3,5-triazine, 2,4-bis-methylsulphonyl-6-N-methylanilino-1,3,5-triazine, 2,4-bis-methylsulphonyl-6-phenoxy-1,3,5-triazine, 2,4-bis-methylsulphonyl-6-trichloroethoxy-1,3,5-triazine, 2,4,6-tris-phenylsulphonyl-1,3,5-triazine, 2,4-bis-methylsulphonylquinazoline, 2,4-bis-trichloromethylsulphonylquinoline, 2,4-bis-carboxymethylsulphonylquinoline, 2,6-bis-(methylsulphonyl)pyridine-4-carboxylic acid and 1-(4'-chlorocarbonylphenyl- or 2'-chlorocarbonylethyl)-4,5-bis-methylsulphonyl-pyridazone(6); further heterocyclic reactive components with labile halogen are, inter alia, 2- or 3-monochloroquinoxaline-6-carboxylic acid chloride or -6-sulphonic acid chloride, 2- or 3-monobromoquinoxaline-6-carboxylic acid or -6-sulphonic acid bromide, 2,3-dichloroquinoxaline-6-carboxylic acid chloride or -6-sulphonic acid chloride, 2,3-dibromoquinoxaline-6-carboxylic acid bromide or -6-sulphonic acid bromide, 1,4-dichlorophthalazine-6-carboxylic acid chloride or -6-sulphonic acid chloride and the corresponding bromine compounds, 2,4-dichloroquinazoline-6- or -7-carboxylic acid chloride or -sulphonic acid chloride and the corresponding bromine compounds 2- or 3- or 4-(4',5'-dichloropyridazone-6'-yl-1')-phenylsulphonic acid chloride or -carboxylic acid chloride and the corresponding bromine compounds, β-(4',5'-dichloropyridazone-6'-yl-1')-ethylcarboxylic acid chloride, 2-chloroquinoxaline-3-carboxylic acid chloride and the corresponding bromine compound, N-methyl-N-(2,4-dichlorotriazinyl-6)-carbamic acid chloride, N-methyl-N-(2-chloro-4-methylamino-triazinyl-6)-carbamic acid chloride, N-methyl-N-(2-chloro-4-dimethylamino-triazinyl-6)-carbamic acid chloride, N-methyl- or N-ethyl-N-(2,4-dichlorotriazinyl-6)-aminoacetyl chloride, N-methyl-, N-ethyl- or N-hydroxyethyl-N-(2,3-dichloroquinoxaline-6-sulphonyl- or -6-carbonyl)-aminoacetyl chloride and the corresponding bromine derivatives; further 2-chlorobenzothiazole-5- or -6-carboxylic acid chloride or -5- or -6-sulphonic acid chloride and the corresponding bromine compounds, 2-arylsulphonyl- or 2-alkylsulphonyl-benzothiazole-5- or -6-carboxylic acid chloride or -5- or -6-sulphonic acid chloride, such as -methylsulphonyl- 2-methylsulphonyl- or 2-ethylsulphonyl- or 2-phenylsulphonyl-benzothiazole-5- or -6-sulphonic acid chloride or -5- or -6-carboxylic acid chloride as well as the 2-sulphonylbenzothiazole derivatives containing sulphonic acid groups in the fused benzene ring; 3,5-bis-methylsulphonyl-isothiazole-4-carboxylic acid chloride, 2-chlorobenzoxazole-5- or -6-carboxylic acid chloride or -sulphonic acid chloride and the corresponding bromine derivatives, 2-chlorobenzimidazole-5- or -6-carboxylic acid chloride or -sulphonic acid chloride and the corresponding bromine derivatives, 2-chloro-1-methylbenzimidazole-5- or -6-carboxylic acid chloride or -sulphonic acid chloride and the corresponding bromine derivatives, 2-chloro-4-methylthiazole-(1,3)-5-carboxylic acid chloride or -4- or -5-sulphonic acid chloride, 2-chlorothiazole-4- or -5-sulphonic acid chloride and the corresponding bromine derivatives.

From the series of aliphatic or araliphatic reactive components there may be mentioned, for example: 1-chloromethylbenzene-4-sulphonic acid chloride, acrylic acid chloride, mono-, di- or trichloroacrylic acid chloride, 3-chloropropionic acid chloride, 3-phenylsulphonylpropionic acid chloride, 3-methylsulphonylpropionic acid chloride, 3-ethylsulphonylpropionic acid chloride, 3-chloroethane-sulphochloride, chloromethanesulphochloride, 2,-chloroacetyl chloride, 2,2,3,3-tetrafluorocyclobutane-1-carboxylic acid chloride, β-(2,2,3,3-tetrafluorocyclobutyl-1)-acrylic acid chloride.

A large number of further suitable reactive components are known from the literature and need therefore not be specially mentioned here.

A group of particularly valuable dyestuffs obtainable according to the process correspond to the formula

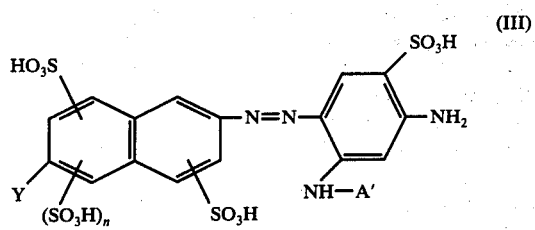

(III)

Therein Y stands for H or NO₂, n is the number 0 or 1, and A' is a pyrimidine-1,3 radical which is linked in the 2- or 4-position and contains 1 or 2 eliminatable alkylsulphonyl, arylsulphonyl, aralkylsulphonyl or heterosulphonyl radicals and may contain further substituents.

The new dyestuffs are valuable reactive dyestuffs which are eminently suitable for the dyeing and printing of materials containing cellulose, especially of natural and regenerated cellulose, the dyestuffs being applied in the presence of acid-binding agents and optionally with the application of an elevated temperature. Dyeings and prints of excellent fastness properties are obtained, especially of very good fastness to wet processing and light.

The dyestuffs are also suitable for the dyeing and printing of materials containing NH-groups, especially of wool, silk and synthetic superpolyamide fibres. In this case, dyeing is carried out in a weakly acidic medium and the pH value of the dyebath is raised towards the end of the dyeing operation to, for example, pH 6.5 to 8.5.

EXAMPLE

19 Parts by weight 1,3-diaminobenzene-4-sulphonic acid are dissolved in 200 parts by volume of water at 60° C with a sodium carbonate solution at pH 6. 25 Parts by weight 2-methylsulphonyl-4,5-dichloro-6-methyl-pyrimidine are introduced into this solution at 60° C, and a pH value of 5 to 6 is maintained in the reaction mixture by the dropwise addition of a 20% sodium carbonate solution. When the condensation is completed, the reaction product is separated by the addition of 60 parts by weight sodium chloride and isolated in the form of a pale yellow paste.

This condensation product is dissolved in 400 parts by volume of water at 40° C, filtered after the addition of a little active charcoal and kieselguhr, and the filtrate is cooled to 10° to 15° C by the addition of ice. To this solution is added the solution of the diazonium compound obtainable in the usual manner from 38.3 parts by weight 2-aminonaphthalene-4,6,8-trisulphonic acid in 450 parts by volume of water, and the mixture is treated with 140 parts by volume of a 20% sodium acetate solution. The coupling proceeds rapidly and completely at pH 4. After 15 minutes, the dyestuff separates in crystalline form. It is isolated and dried at 60° C in a vacuum. The monoazo dyestuff obtained corresponds to the formula

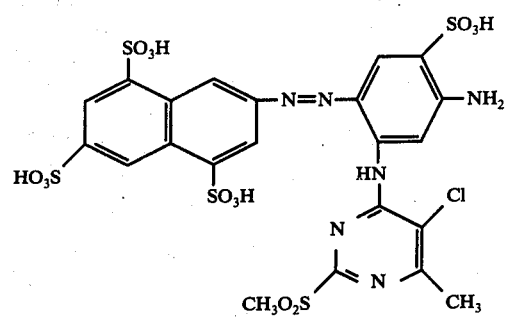

when dried, it is an orange-coloured powder which dissolves in water to give a yellow solution and dyes cotton by the usual methods of reactive printing or reactive dyeing in reddish yellow shades.

If the 2-aminonaphthalene-4,6,8-trisulphonic acid is replaced in the present Example with equivalent amounts of 2-aminonaphthalene-4,8-disulphonic acid, 2-aminonaphthalene-6,8-disulphonic acid or 6-nitro-2-aminonaphthalene-4,8-disulphonic acid, or by the equivalent amounts of the diazo compounds of the formulae

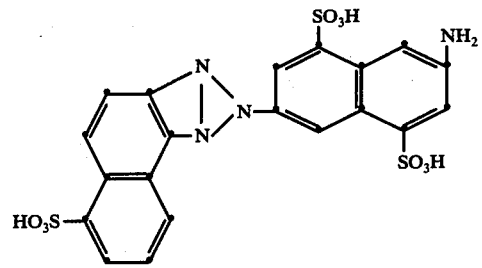

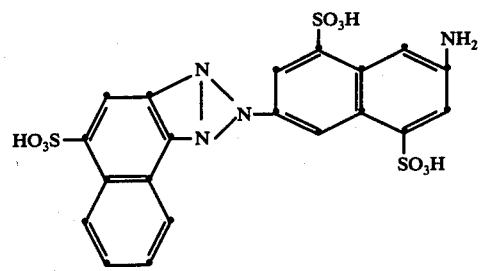

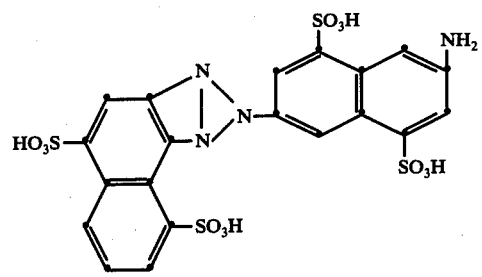

then the analogous method of operation yields reactive dyestuffs which dissolve in water to give a yellow solution and yield on cotton in the presence of acid-binding agents reddish yellow prints or dyeings.

If the 2-methylsulphonyl-4,5-dichloro-6-methyl-pyrimidine is replaced in the processes of the present Example with equivalent amounts of each of the reactive components stated in the following Table, then valuable reactive dyestuffs are also obtained, which dye cotton by the known methods of reactive dyeing in fast yellow shades:
2,4,6-trichlorotriazine-1,3,5
2,4-dichloro-6-aminotriazine-1,3,5
2,4-dichloro-6-methylaminotriazine-1,3,5
2,4-dichloro-6-hydroxyethylaminotriazine-1,3,5
2,4-dichloro-6-phenylaminotriazine-1,3,5
2,4-dichloro-6-o- or -m- or -p-sulphophenylaminotriazine-1,3,5
2,4-dichloro-6-N-methyl-N-phenylaminotriazine-1,3,5
2,4,5,6-tetrachloropyrimidine-1,3
2,4,6-trichloropyrimidine-1,3
2,4-dichloropyrimidine-5-carboxylic acid chloride
2-methylsulphonyl-4-chloropyrimidine-5-carboxylic acid chloride
2-chlorobanzothiazole-5- or -6-carboxylic acid chloride
2-chlorobenzothiazole-5- or -6-sulphonic acid chloride
2-methylsulphonyl- or 2-ethylsulphonyl-benzothiazole-5- or -6-carboxylic acid chloride or -sulphonic acid chloride
1,4-dichlorophthalazine-6-carboxylic acid chloride
2,3-dichloroquinoxaline-6-carboxylic acid chloride
3,5-bis-methylsulphonyl-isothiazole-4-carboxylic acid chloride
2,4-bis-methylsulphonylquinazoline
2-methylsulphonyl-4-chloroquinazoline
2,4-bis-methylsulphonyl-6-chloropyrimidine
2-methylsulphonyl-4-chloro-5-cyano-6-methoxypyrimidine
2-methylsulphonyl-4-chloro-6-carbomethoxypyrimidine
2-methylsulphonyl-4-chloropyrimidine-6-carboxylic acid
2,4,6-trifluoropyrimidine
2-methylsulphonyl-4,6-dichloropyrimidine
2-carboxymethylsulphonyl-4-chloro-6-methylpyrimidine
2-trichloromethylsulphonyl-4-chloro-6-methylpyrimidine
2,4,6-trifluoro-5-chloropyrimidine (condensing with the —NH₂— group in 4-position of the pyrimidine ring)
2,4-dichloro-6-(3'-carboxyphenylamino)-triazine-1,3,5

I claim:
1. A reactive azo dyestuff of the formula

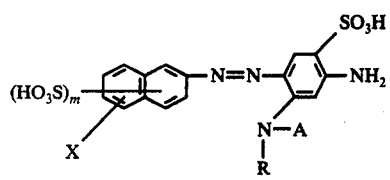

wherein
X stands for hydrogen, halogen, nitro, monosulfonaphthtriazolyl or disulfonaphth-triazolyl
$m$ stands for the number 2 or 3;
A is a group adapted to react with the OH groups of cellulose with the formation of covalent bonds, wherein A is bonded to

via a carbon atom of the group A; and R stands for hydrogen or $C_{1-3}$ alkyl.
2. The dyestuff of claim 1 wherein Y is hydrogen.
3. A reactive azo dyestuff of claim 1 of the formula

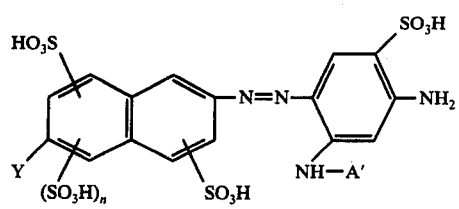

wherein
Y stands for nitro, hydrogen, monosulfonaphthtriazolyl or disulfonaphth-triazolyl;
$n$ stands for the integer 0 to 1; and
A' stands for a diazine or triazine ring bonded to —NH— via a carbon atom of the said ring and having attached to at least one carbon atom of said ring a reactive substituent adapted to react with the OH groups of cellulose with the formation of covalent bonds selected from the group consisting of chloro, bromo, fluoro, lower alkylsulfonyl which is unsubstituted in the alkyl group or is substituted by carboxy, chloro, or sulfo; phenylsulfonyl which is unsubstituted in the phenyl group or is substituted by a carboxy or sulfo radical; or ammonium; and wherein the other carbon atoms of said ring are unsubstituted, are substituted by one of said reactive substituents or are substituted by a radical which does not impair the reactivity of said reactive substituents.
4. The dyestuff of claim 3 wherein Y is hydrogen.
5. A reactive azo dyestuff of claim 3 of the formula

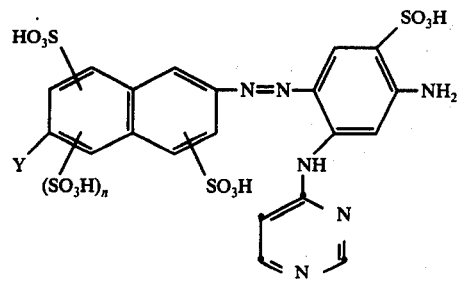

wherein
Y stands for nitro, hydrogen, monosulfonaphthtriazolyl or disulfonaphth-triazolyl;
$n$ stands for the integer 0 to 1; and
wherein the pyrimidine is bound in the 4-position and has attached to at least one carbon atom in 2- and 6-position a reactive substituent adapted to react with the OH groups of cellulose with the formation of covalent bonds selected from the group consisting of lower alkyl-sulphonyl where the alkyl radical is unsubstituted or substituted by Cl, COOH, or SO₃H; and phenylsulphonyl where the phenyl group is unsubstituted or substituted by a SO₃H or COOH group.

6. The dyestuff of claim 5 wherein Y is hydrogen.
7. A reactive azo dyestuff of claim 1 of the formula

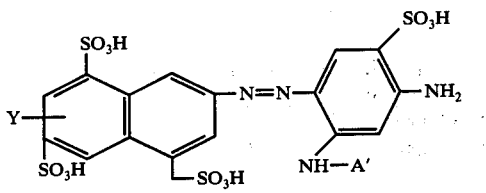

wherein
Y stands for nitro, hydrogen, monosulfo naphthotriazolyl, or disulfo-naphthotriazolyl;
A' is a reactive group selected from the group consisting of pyrimidinyl, pyrimidine carbonyl, sym.-triazinyl, benzothiazolecarbonyl, benzothiazole-sulfonyl, phthalazine carbonyl, quinoxaline carbonyl, isothiazole carbonyl, or quinazolinyl, wherein said reactive group contains a reactive substituent attached to a carbon atom of the heterocyclic ring, selected from the group consisting of chloro, lower alkylsulfonyl, fluoro, carboxymethylsulfonyl, and trichloromethylsulfonyl and the other carbons contain members of the group consisting of hydrogen, chloro, amino, methylamino, hydroxyethylamino, phenylamino, sulfo-phenylamino, N-methyl, N-phenylamino, methylsulfonyl, cyano, methoxy, carbomethoxy, fluoro, methyl and carboxyphenylamino.

8. The dyestuff of claim 7 wherein Y is hydrogen.
9. A reactive dyestuff of claim 1 of the formula

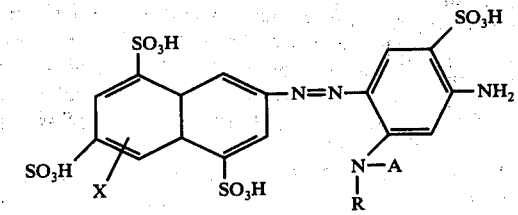

wherein
X stands for hydrogen, halogen, or nitro;
R stands for hydrogen or $C_{1-3}$ alkyl, and A is a reactive group selected from the group consisting of triazinyl, pyrimidinyl, pyrimidine carbonyl, pyrimidine sulfonyl, triazinylcarbamyl, triazinylaminoacetyl, wherein said reactive group contains at least one reactive substituent attached to a carbon atom of the heterocyclic ring, selected from the group consisting of chloro, bromo, fluoro, lower alkylsulfonyl, ammonium, phenylsulfonyl, carboxyphenylsulfonyl, sulfophenylsulfonyl, carboxymethylsulfonyl, trichloromethylsulfonyl and sulfoethylsulfonyl and wherein the other atoms of the said heterocyclic ring which do not contain a listed reactive substituent contain a non-reactive substituent.

10. A reactive azo dyestuff of claim 1 of the formula

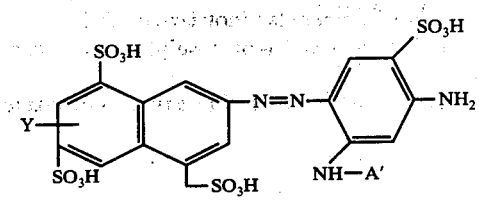

wherein
Y stands for nitro or hydrogen;
A' is a reactive group selected from the group consisting of pyrimidinyl, pyrimidine carbonyl, sym.-triazinyl, wherein said reactive group contains a reactive substituent attached to a carbon atom of the heterocyclic ring, selected from the group consisting of chloro, lower alkylsulfonyl, fluoro, carboxymethylsulfonyl, and trichloromethylsulfonyl.

11. A reactive azo dyestuff of claim 1 of the formula

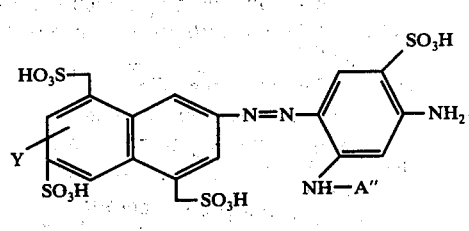

wherein
Y stands for nitro or hydrogen;
A" stands for a pyrimidine ring bound in the 4-position and having attached to at least one atom in the 2- and 6-position, a reactive substituent selected from the group consisting of lower alkylsulfonyl, phenylsulfonyl, sulfoethylsulfonyl, carboxymethylsulfonyl and trichloromethylsulfonyl wherein the 2- and 6-position which does not contain such substituent contains a substituent selected from the group consisting of hydrogen, methyl, ethyl, fluoro, chloromethyl, chloro, methoxy, carboxy, methoxycarbonyl, and wherein the 5-position contains a substituent selected from the group consisting of hydrogen, chloro, fluoro, bromo, nitro, cyano, methylsulfonyl, sulfo, carboxy.

12. The reactive dyestuff of claim 1 having the formula

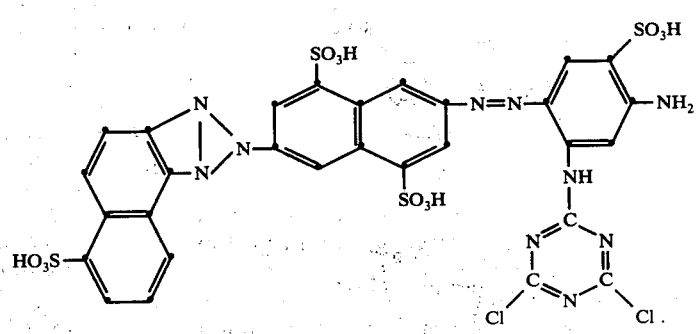

13. The reactive dyestuff of claim 1 having the formula
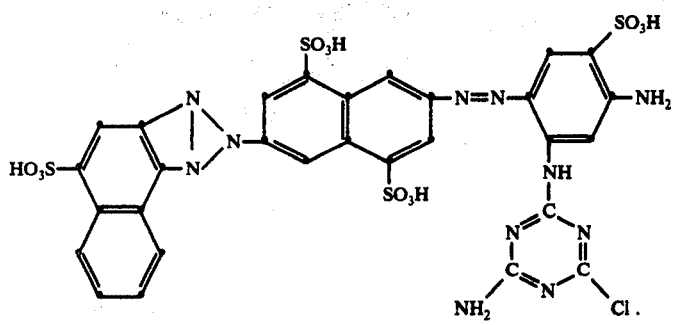
14. The reactive dyestuff of claim 1 having the formula
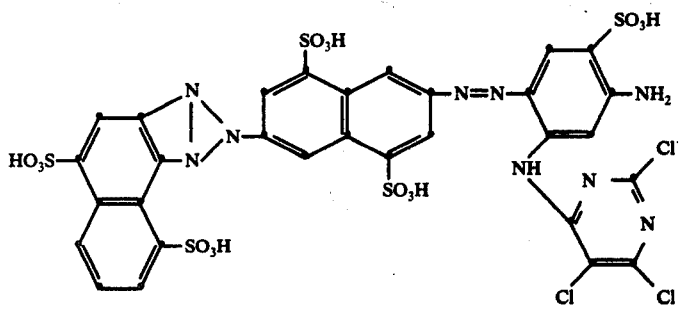
15. The reactive dyestuff of claim 1 having the formula
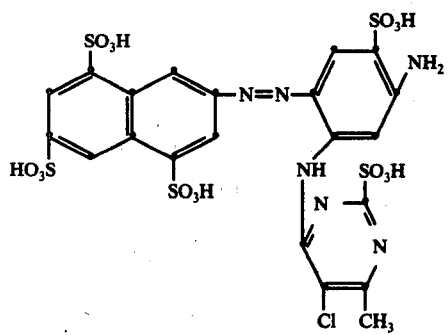
16. The reactive dyestuff of claim 1 having the formula
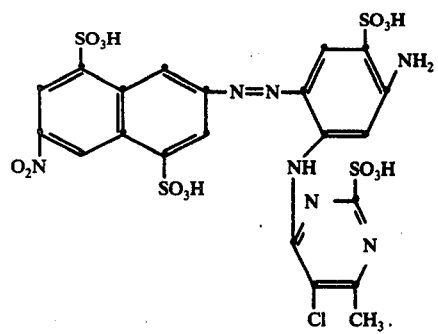
17. The reactive dyestuff of claim 1 having the formula
18. The reactive dyestuff of claim 1 having the formula
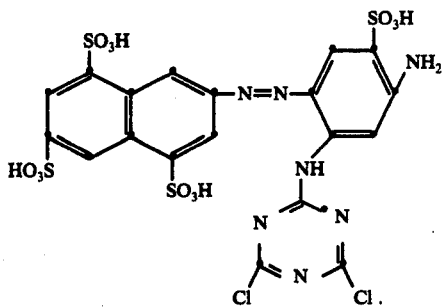
19. The reactive dyestuff of claim 1 having the formula
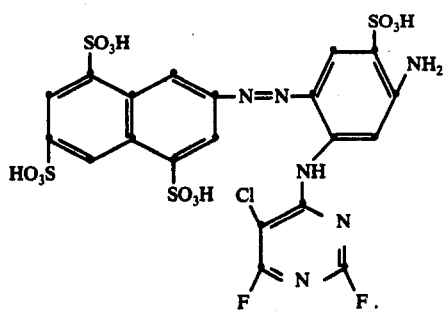

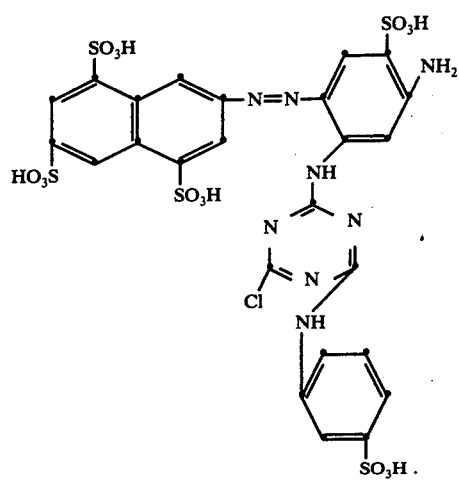
20. The reactive dyestuff of claim 1 having the formula
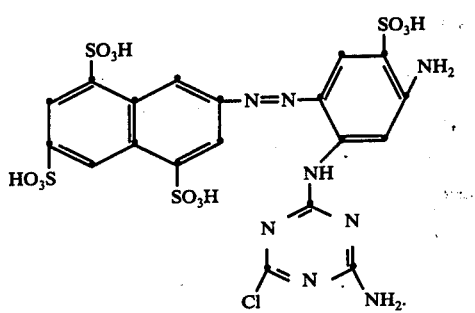
21. The reactive dyestuff of claim 1 having the formula
22. The reactive dyestuff of claim 1 having the formula
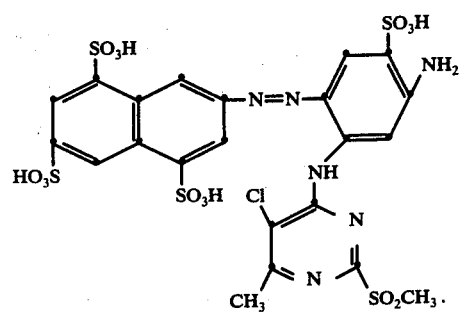
23. The reactive dyestuff of claim 1 having the formula
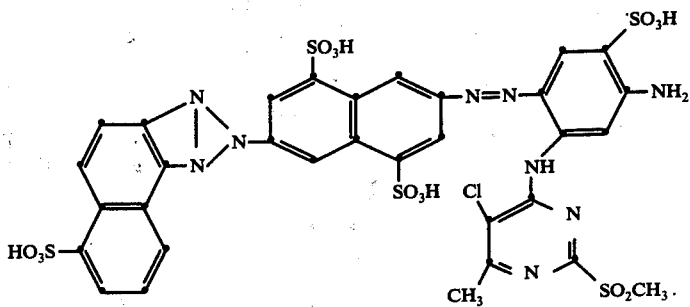
* * * * *